Nov. 15, 1966 B. K. HALLAMORE 3,285,612

RECORDING AND PLAYBACK APPARATUS

Filed April 9, 1965 4 Sheets-Sheet 1

INVENTOR.
BARRY K. HALLAMORE
BY Christie, Parker & Hale
ATTORNEYS.

INVENTOR.
BARRY K. HALLAMORE
BY
Christie, Parker & Hale
ATTORNEYS.

INVENTOR.
BARRY K. HALLAMORE
BY
Christie, Parker & Hale
ATTORNEYS.

INVENTOR.
BARRY K. HALLAMORE
BY
Christie, Parker & Hale
ATTORNEYS.

3,285,612
Patented Nov. 15, 1966

3,285,612

RECORDING AND PLAYBACK APPARATUS

Barry K. Hallamore, Westminster, Calif., assignor, by mesne assignments, of thirty-seven and one-half percent to Audio Slide Company, a partnership Filed Apr. 9, 1965, Ser. No. 446,842
12 Claims. (Cl. 274—11)

This application is a continuation-in-part of my application Ser. No. 114,944, filed June 5, 1961, now Patent No. 3,177,768 which was a continuation-in-part of my application Ser. No. 725,313, filed March 31, 1958, and now abandoned.

The present invention relates to recording and playback apparatus.

From one basic aspect thereof, my above mentioned patent application Ser. No. 114,944 discloses recording apparatus in which spring means coupled between a relatively stationary support and a reel automatically rewind an elongated recording medium back onto the reel after a recording or a playback operation.

According to one aspect of the subject invention, the recording medium comprises an elongated resilient member which itself forms the spring that automatically rewinds the elongated member. In this manner, a separate spring becomes unnecessary.

A recording and playback apparatus according to a preferred embodiment of the subject invention comprises a support which defines a storage region and a receiving region for a recording medium. The recording medium comprises an elongated resilient member forming in the storage region a coil spring having a preshaped initial configuration and having the property of rewinding itself into this initial configuration when a portion of the elongated resilient member has been pulled from this coil spring. A portion of the elongated resilient member is pulled from the coil spring during recording or playback operations. After a recording or a playback operation, the portion of the elongated resilient member which has been pulled from the coil spring is released. This permits the coil spring to rewind itself into the above mentioned initial configuration preparatory to a further recording or playback operation.

It will be recognized that this embodiment is particularly advantageous in that it does not need any particular rewinding means for the recording medium but employs an automatically rewinding recording medium structure.

The invention also provides recording and playback apparatus which include means for controlling the rate of speed by which the above mentioned coil spring rewinds onto itself the portion of the elongated resilient member that has been pulled therefrom. If the rate of rewinding is thus controlled, the recording or the playback operation can take place during the automatic rewinding operation, which has the advantage that the means which move the elongated member from the coil spring need not be of the more expensive and complicated constant-speed type. A simple drive may thus be used to pull the elongated member from the coil spring.

In a similar vein, the invention provides a recording and playback apparatus in which a recording tape or wire is rewound onto a coil and in which the rate of such rewinding is controlled to enable recording and playback operations during rewinding of the tape or wire.

The invention further provides a recording and playback apparatus which comprises a threaded shaft, a drum located on the threaded shaft for rotary movement about the shaft and simultaneous translatory movement along the shaft from an initial position to an advanced position, spring means for returning the drum from the advanced position to the initial position, and a recording medium on the drum for selectively receiving and yielding information during rotary movement of the drum about the shaft.

The invention and its various features will become more readily apparent from the following detailed description of preferred embodiments thereof, illustrated by way of example in the accompanying drawings, in which.

In the drawings, like reference numerals designate like parts in the various figures.

Figure 1:
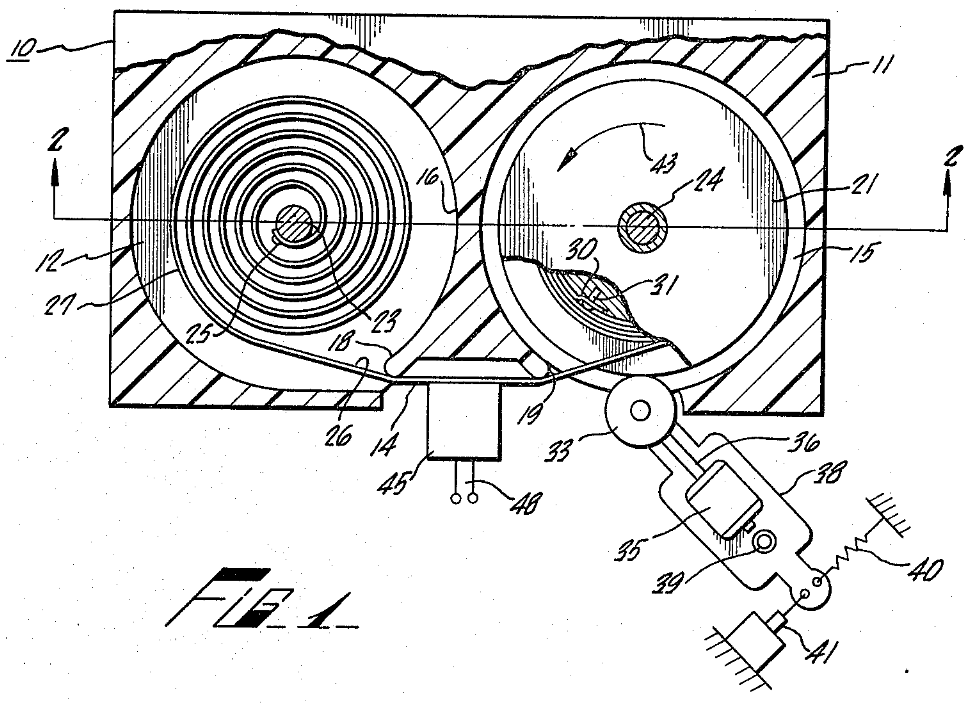
FIGURE 1 is a plan view partially broken away of a recording and playback apparatus in accordance with a first preferred embodiment of the present invention, including a schematic showing of a recording and playback transducer and a drive for utilizing and operating the same.
Figure 2:
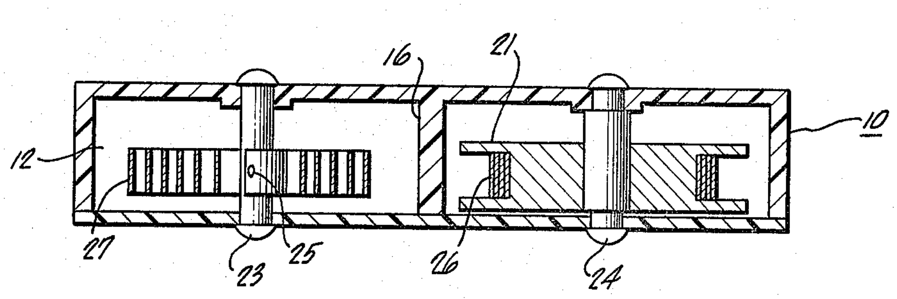
FIGURE 2 is a horizontal section view taken along line 2—2 of FIGURE 1.

The recording and playback apparatus 10 illustrated in FIGS. 1 and 2 comprises a support 11 which defines a storage region 12 for a recording medium 14 and a receiving region 15 for this recording medium. In the illustrated embodiment, the regions 12 and 15 are separated by a wall portion 16. The support 11 also defines a pair of shoulders 18 and 19 for guiding the recording medium 14 between the regions 12 and 15. A post 23 is located in the storage region 12 and a reel 21 in the receiving region 15. Reel 21 is rotatably mounted on a post 24. The post 23 is rigidly affixed to the support 11.

The recording medium 14 comprises an elongated resilient member 26 forming a coil spring 27 in the storage region 12. The spring 27 has a preshaped initial coil configuration and has the property of rewinding itself into this initial configuration when a portion of the elongated member 26 has been pulled from the coil. The inner end of the coil spring 27 is riveted to the stationary post 23 by means of a pin 25.

In the view shown in FIGS. 1 and 2, a portion of the elongated member 26 has already been pulled from the coil 27 and has been wound on the reel 21 in the receiving region 15. This portion will rewind itself automatically onto the coil 27 when the reel 21 is released for free rotation, as will become more readily apparent as this description proceeds.

Initially, an end 30 of the elongated member 26 is connected to the reel 21 by a pin 31. When the reel 21 rotates in the direction of arrow 43, portions of the elongated member 26 are pulled from the coil 27 and wound onto reel 21 in the receiving area 15.

The reel is rotated in the direction of arrow 43 by a drive pulley 33. This pulley is driven by an electric motor 35. To this end, a reduction gear (not shown) is connected between the motor shaft 36 and the pulley 33. The pulley 33 and the motor 35 are mounted on a support 38 which is pivotally movable about a pin 39. A bias spring 40 normally maintains the support 38 in a position so that the drive pulley 33 does not contact the reel 21. In the view shown in FIG. 1, the support 38 and pulley 33 have been moved into an active position by a plunger solenoid 41. In this active position, the pulley 33 engages a rim of the reel 21 so that the wheel 21 is rotatably driven when the motor 35 is energized while the plunger 41 is in its active position. Both the motor 34 and the plunger solenoid 41 are connected to suitable electric leads (not shown) for the electrical energization thereof.

Figure 3:
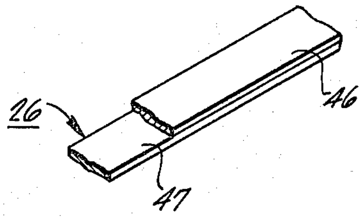
FIG. 3 shows a portion of the recording medium utilized in the apparatus of FIGS 1 and 2.

When the drive pulley 33 is in the position shown in FIG. 1 and the reel 21 is rotated in the direction of arrow 43, portions of the elongated member will be pulled from the coil 27, will be moved past a transducer 45, and will be wound on the reel 21. The elongated member 26, which in FIGS. 1 and 2 has the form of a tape, may be of a magnetic recording material. Alternatively, a shown in FIG. 3, the elongated resilient member 26 may have a magnetic recording coating 46 on the tape 47 of a resilient material with the above mentioned self-winding properties.

The transducer 45 shown in FIG. 1 may be a magnetic recording transducer which, through a pair of leads 48 is energized with an electric recording current from conventional magnetic recording equipment (not shown). As the elongated member or tape 26 is moved from the region 12 to the region 15, information is recorded thereon by means of the transducer 45. If the plunger solenoid 41 is de-energized so that the pulley 33 moves out of engagement with the reel 21, the coil spring 27 will automatically rewind itself around the post 23 and will pull the tape 26 back from the reel 21 into the region 12, except for the short portion thereof which is permanently connected to the reel 21 by means of the pin 31. The information recorded on the tape 26 can now be played back by moving the pulley 33 again into engagement with the reel 21 and by rotating this pulley so that the reel 21 is again turned in the direction of arrow 43. The head 45 is now a playback head and the equipment connected to the leads 48 is a conventional amplifier and sound reproducing apparatus (not shown).

It will now be recognized that the apparatus shown in FIGS. 1 and 2 constitutes a simple and effective means for recording messages and short pieces of information.

If desired, this apparatus can further be simplified. For example, it is not absolutely necessary that a reel be provided in the receiving region 15. For example, the drive pulley 33 could work directly on the tape 14, such as against an idler roller or a fixed surface (not shown), so as to draw tape from the storage region 12 and push it into the receiving region 15 where it will wind itself into a coil, and from which it will be pulled back into the storage region 12 and onto the coil spring 27.

It will also be recognized that the apparatus shown in FIGS. 1 and 2, and also in FIG. 4 subsequently to be described, could employ a resilient wire in the place of the tape 26. This wire could be covered with a coating of a magnetic recording material in a manner similar to that shown for the tape 26 in FIG. 3.

Figure 4:
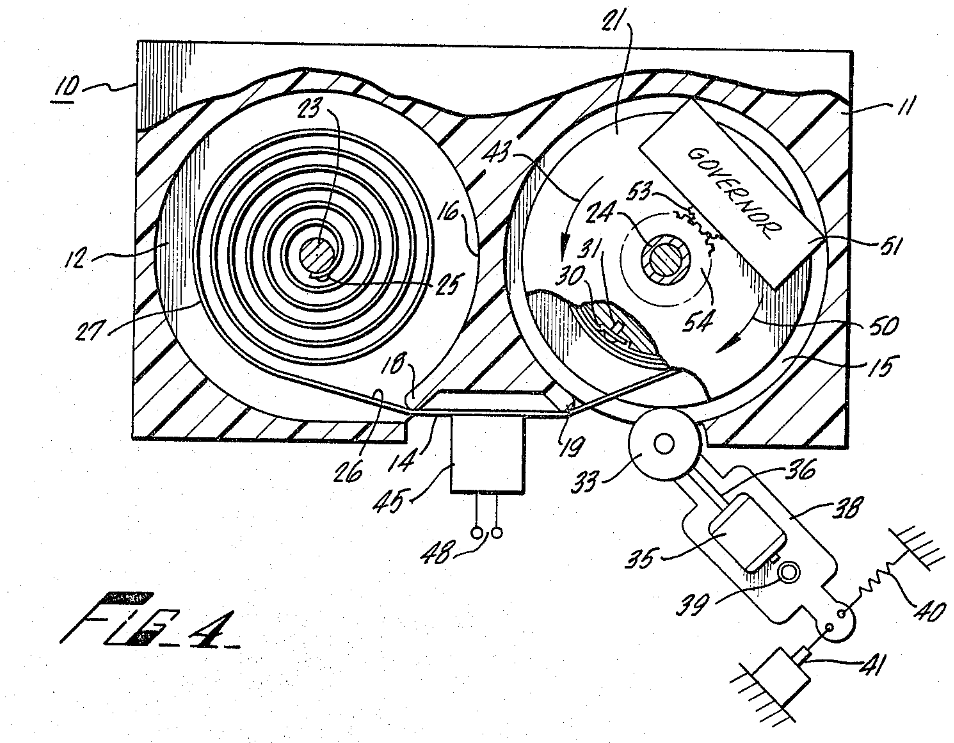
FIG. 4 is a plan view partially broken away of a recording and playback apparatus in accordance with a second preferred embodiment of the present invention, including a schematic showing of a recording and playback transducer and a drive for utilizing and operating the same.

The apparatus shown in FIG. 4 has the same basic structure as the apparatus in FIG 1. The reference numerals shown in FIG. 1 have, therefore, been employed to designate like parts in FIG. 4, and reference should be had to the description of FIG. 1 for an explanation of the nature and function of these like parts.

The functional difference between the apparatus shown in FIG. 4 and the apparatus shown in FIGS. 1 and 2 is that the information is recorded on and is played back from the tape 26 while this tape rewinds itself from the reel 21 onto the coil spring 27.

Initially, the tape 26, which is again of a resilient, self-winding material, is disposed on the post 23 and in the storage region 12 in the form of a coil spring 27. An end 30 is again connected to the reel 21 by a pin 31. The drive pulley 33 is moved into engagement with the wheel 21 so as to rotate this wheel in the direction of the arrow 43. Tape is thus pulled from the coil 27 and wound onto reel 21. After a desired length of tape has been wound onto the reel 21, the drive pulley 33 is stopped by de-energization of the motor 34. If it is desired that the transducer 45 record information on tape 26 or play back information already recorded on the tape, the plunger solenoid 41 is de-energized so that the roller 33 will disengage from the reel 21. The bias produced by the coil spring 27 then causes the tape to rewind itself into the region 12. This will cause the reel 21 to rotate in the direction of the arrow 50 and the tape 26 to move past the transducer 45 for recording or playback purposes.

To enable a recording or playback operation during the rewinding of the tape onto the coil 27, the speed of rotation of the reel 21 is controlled by a governor 51 which is effective when the reel 21 rotates in the direction of arrow 50. To this end, the governor has a drive pinion 53 which meshes with a gear wheel 54 connected to the reel 21. The governor 51 is only shown schematically in FIG. 4 because it is intended to be of the well-known type of governor employed in telephone apparatus equipped with a telephone number dial which is rotated by a certain amount and is then released to cause the generation of the desired number of dialing pulses. The type of governor used in these telephone dialing devices has the function of controlling the speed of rotation of the dial when it moves from an advanced position back to the initial rest position. On the other hand, this type of governor does not materially interfere with the free movement of the dial when it is rotated from its initial rest position to an advanced position.

The type of governor used in telephone number dialing devices of the type described above is thus suited for the apparatus of FIG. 4, since it can be geared to control the rotation of the reel 21 in the direction of arrow 50, while not interfering with the movement of the reel 21 in the direction of the arrow 43. It will now be recognized that the various well-known makes of governors of the type mentioned above are suitable for the purposes of FIG. 4, so that a detailed showing and description of the internal mechanism of governor 51 is deemed unnecessary in this application.

The provision of the governor 51 according to FIG. 4 has the advantage that the drive motor 35 need not be of a constant-speed type but may be of a simple and inexpensive make, since the recording and the playback operations take place in the embodiment of FIG. 4 while the motor 35 is de-energized and the drive pulley 33 is disengaged from the reel 21.

The gearing of the governor 51 with the reel 21 presents a particularly simple solution, since it dispenses with the necessity of special tape-engaging equipment, such as pinch rollers to which the governor would be connected. Of course, if the governor controls the speed of rotation of the reel 21, the speed of tape 26 will not be constant, but will decrease as the number of turns of tape 26 on reel 21 decreases during rewinding of the tape onto coil 27. However, this does not impair the fidelity of a playback process, since the speed varies in the same sense during recording and during playback operations. If desired, the governor could also be geared to the drive roller 33, rather than to the reel 21. In this case, the plunger solenoid 41 would be left energized, but the drive 35 de-energized during the rewinding of the tape 14.

It will now be recognized that the embodiment illustrated in FIG. 4 constitutes a simple but efficient apparatus for the recording of messages or short pieces of information.

Figure 5:
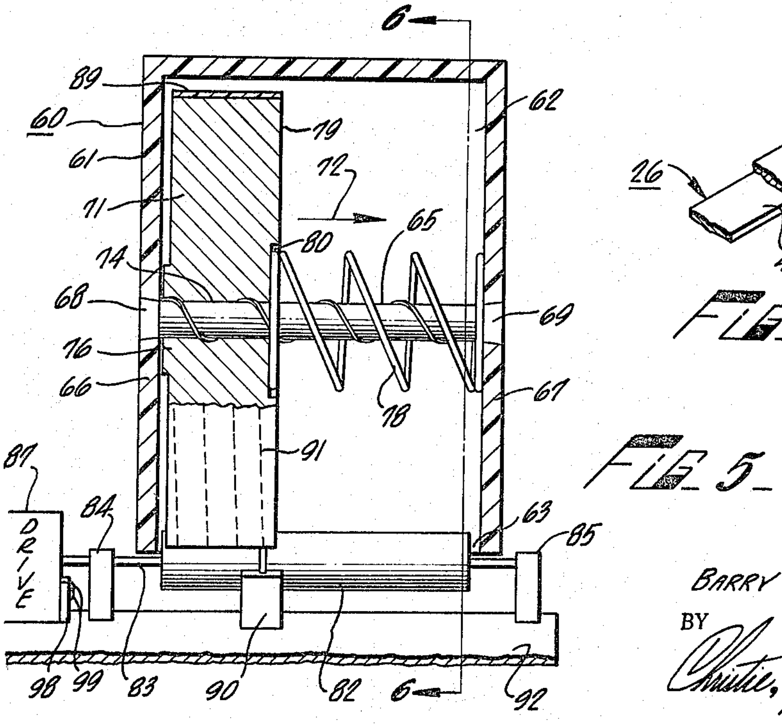
FIG. 5 is a horizontal sectional view of a recording and playback apparatus in accordance with a third preferred embodiment of the invention, including a schematic showing of a recording and playback transducer and a drive for utilizing and operating the same.
Figure 6:
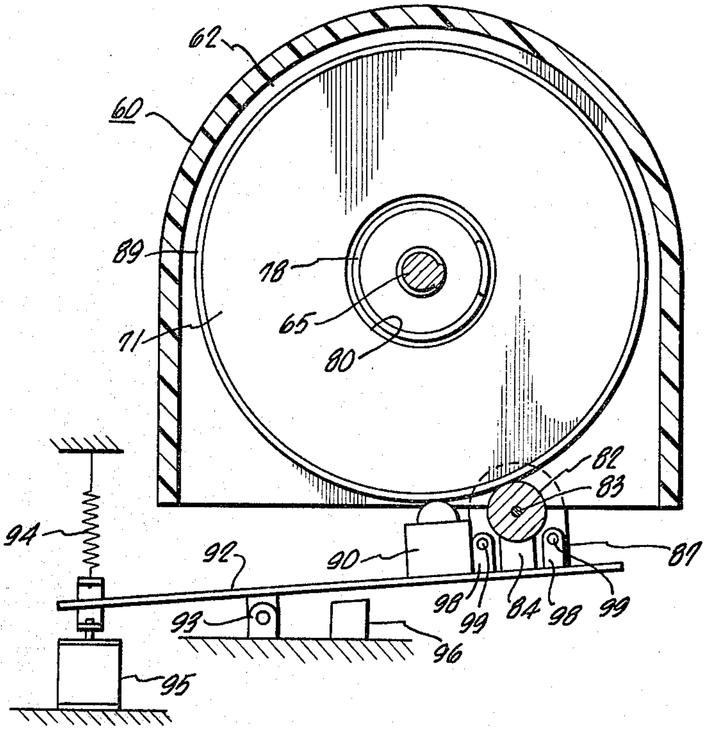
FIG. 6 is a horizontal sectional view taken along line 6—6 of FIG. 5.

The recording apparatus 60 in accordance with the embodiment shown in FIGS. 5 and 6 has a housing 61 which defines an internal cavity 62 having an opening 63. A threaded shaft 65 extends through the housing cavity 62 from one housing wall 66 to an opposite housing wall 67. The shaft 65 is fastened or riveted to the wall 66 at 68 and to the wall 67 at 69. A drum 71 is located on the threaded shaft 65 for rotary movement about the shaft and simultaneous translatory movement along the shaft in the direction of arrow 72 from the initial position of the drum shown in FIG. 5 to an advanced position adjacent the housing wall 67. To this end, the drum 71 has a central, axial aperture 74 which defines an internal thread that meshes with the external thread of the shaft 65.

The drum defines a small lateral protrusion 76 which engages the housing wall 66 and which has the purpose of preventing binding of the drum to this housing wall. A helical spring 78 is provided between the housing wall 67 and the side 79 of the drum which faces in the direction of this wall 67. The drum 71 defines a small lateral cavity or socket 80 for receiving an end of the spring 78. The spring 78 biases the drum 71 in a direction opposite to the direction of arrow 72 as will be more readily apparent as this description proceeds.

The drum 71 is rotated by means of a roller 82 which extends into the housing opening 63 to contact the outer periphery of the drum. The drum 82 is located on a shaft 83 which is rotatably mounted by two bearings 84 and 85 and which is driven by a drive 87. The drive 87 may include a small electric motor and a reduction gear.

The drive 87 is energized to rotate the roller 82 in such a direction that the drum 71 is driven to move translatorily in the direction of the arrow 72, thereby rotating around the shaft 65. The outer periphery of the drum 71 carries a layer 89 of a conventional magnetic sound recording medium. A conventional magnetic head 90 records information on the layer 89 during the rotation of the drum 71 about the shaft 65. The spiral recording track thus provided is indicated in FIG. 5 by a family of dotted lines 91. As the drum rotates and proceeds in the direction of arrow 72, the spring 78 is compressed more and more between the drum 71 and the wall 67. The pitch of the external thread on the shaft 65 and the internal thread at the drum aperture 74 is such that the drum 71, by force of the spring 78, is rotated and translatorily moved back to its initial position shown in FIG. 5 when the drive roller 82 is removed from the periphery of the drum. The selection of such a pitch is already well known in the art of mechanical engineering, so that it is not further described herein.

The mechanism for moving the roller 82 out of contact with the drum 71 preparatory to a movement of the drum from an advanced position back to its initial position includes a supporting plate 92 which is pivotally mounted at 93 for movement in a first direction under the influence of a bias spring 94 and in an opposite direction under the influence of a plunger solenoid 95. A stop member 96 limits the movement of the plate 92 in the above mentioned first direction.

The above mentioned bearings 84 and 85 are mounted on the plate 92 so that the roller 82 is moved into engagement with the drum 71 when the plunger solenoid 95 is energized, and is moved out of engagement with the drum when the plunger solenoid 95 is deenergized.

The drive 87 is mounted on a flange 98 of the plate 92, by means of bolts 99. Both the drive 87 and the plunger solenoid 95 are energized from conventional electric current sources (not shown).

In the embodiment illustrated in FIGS. 5 and 6, the recording transducer 90 is also mounted on the plate 92, so as to be removed from the recording layer 89 as the drum is spun back to its initial position.

The apparatus shown in FIGS. 5 and 6 is operated as follows:

The plunger solenoid 95 is energized so that the drive roller 82 moves into contact with the periphery of the drum 71 which at this instant is in its initial position shown in FIG. 5. The drive 87 is then energized to rotate the roller 82 which, in turn, will rotate the drum 71 about the threaded shaft 65 and will cause translatory movement of the drum in the direction of the arrow 72 shown in FIG. 5. During such movement of the drum 71, the recording transducer or head 90 which, in the embodiment illustrated in FIGS. 5 and 6, is a magnetic recording head, is energized with the information or signal that is to be recorded on the magnetic layer 89. The information will thus be recorded on the layer 89 along a spiral path, part of which is indicated by the dotted lines 91.

After the recording has been completed, the drum 71 will occupy an advanced position relatively close to the housing wall 67 shown in FIG. 5. The spring 78 will be compressed and will exert a force on the drum 71 that acts in a direction opposite to the direction of arrow 72. The drive 87 is then de-energized and the roller 82 stops to rotate. The plunger solenoid 95 is also de-energized so that the plate 92 moves from the position shown in FIGS. 5 and 6 to a position delimited by the stop member 96. Both the roller 82 and the recording head 90 will thus be disengaged from the drum 71 or recording layer 89 thereof.

In view of the flat pitch of the threaded shaft 65, the spring 78 will then be able to spin the drum 71 back to its initial position shown in FIG. 5. Playback of the recorded information is thereafter effected in the same manner as has just been described for the recording process. It will, of course, be understood that the transducer 90, during the recording operation is a recording head and during the playback operation is a playback head. If desired, the same head may be used for recording and for playback, as is well known in the art. The equipment which energizes the transducer 90 and which amplifies and makes audible signals picked up by this transducer is not specifically described or illustrated herein, since it is well-known in the art.

It will now be recognized that the apparatus shown in FIGS. 5 and 6 constitutes a further efficient recording means with automatic repositioning of the recording medium after a recording or a playback operation.

Figure 7:
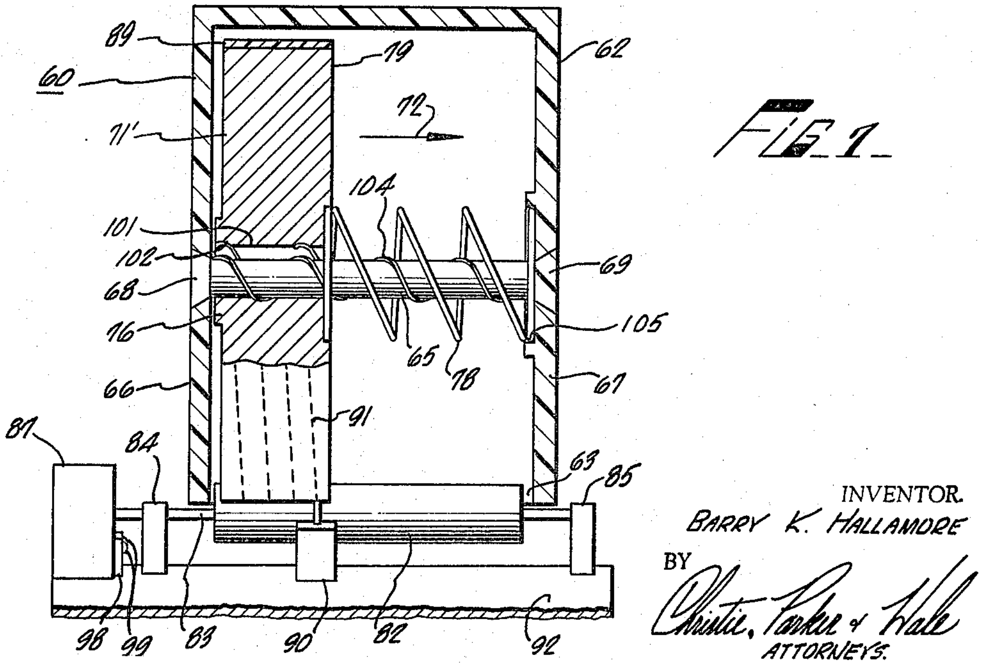
FIG. 7 is a horizontal sectional view of a modification of the apparatus shown in FIGS. 5 and 6.

The apparatus shown in FIG. 7 is for the most part identical to the apparatus shown in FIGS. 5 and 6, so that like reference numerals have been employed to designate like parts.

In contrast to the drum 71 shown in FIGS. 5 and 6, the drum 71' illustrated in FIG. 7 defines an axial aperture 101 which has a larger diameter than the threaded shaft 65. This aperture 101 is provided with an internal thread 102 designed and dimensioned to mesh with the external thread 104 of the shaft 65.

In the embodiment shown in FIG. 7, the drive roller 82 does not only have the purpose of contacting and rotating the drum 71', but also has the function of moving the drum 71' radially by a predetermined distance to place the internal thread 102 at the drum aperture 101 into meshing engagement with the thread 104 of the shaft 65. The drum 71' will thus again be translatorily moved in the direction of the arrow 72 mentioned in conjunction with FIGS. 5 and 6, when the drive roller is moved into engagement with the drum 71' and rotates this drum about the threaded shaft 65. The recording or playback operation is otherwise the same as the one described in connection with the embodiments of FIGS. 5 and 6.

As the drum 71' in the embodiment of FIG. 7 is moved in the direction of arrow 72 to an advanced position closer to the housing wall 67, the spring 78 is more and more compressed. According to FIG. 7, the outer end of this spring is received in a socket 105 on the inside of the housing wall 67, so as to exercise a certain centering action on the drum 71'. When the roller 82 is removed from the drum 71' at the end of a recording or playback operation, in the manner described above, the spring 78 will exert its centering action and will move the drum 71' so that the internal thread 102 at the drum aperture 101 moves out of engagement with the external thread 104 on the shaft 65. The drum 71' will thus be pushed back to its initial position shown in FIG. 7 without having to be rotated about the shaft 65 during such repositioning movement.

At the beginning of the next playback or recording operation, the internal thread 102 is again moved into meshing engagement with the shaft thread 104. This is accomplished by the drive drum 82 in the manner mentioned above.

It will now be recognized that the apparatus shown in FIG. 7 is characterized by a particularly speedy resetting of the recording medium after a recording or playback operation, since the drum 71' is reset from an advanced position to its initial position without having to be rotated around the shaft 65 for the purpose of such resetting. Another advantage of the embodiment shown in FIG. 7 resides in the fact that a shaft thread 104 of a steeper pitch can be employed, since the drum 71', during a resetting operation, is not spun back around the shaft 65 and along the thread 104, but is translatorily moved past such thread. A steeper pitch of the thread 104 will, in turn, provide for a steeper pitch of the spiral recording track 91 on the recording medium 89. In this manner, the amount of information that can be received on the drum 71' is augmented.

Figure 8:
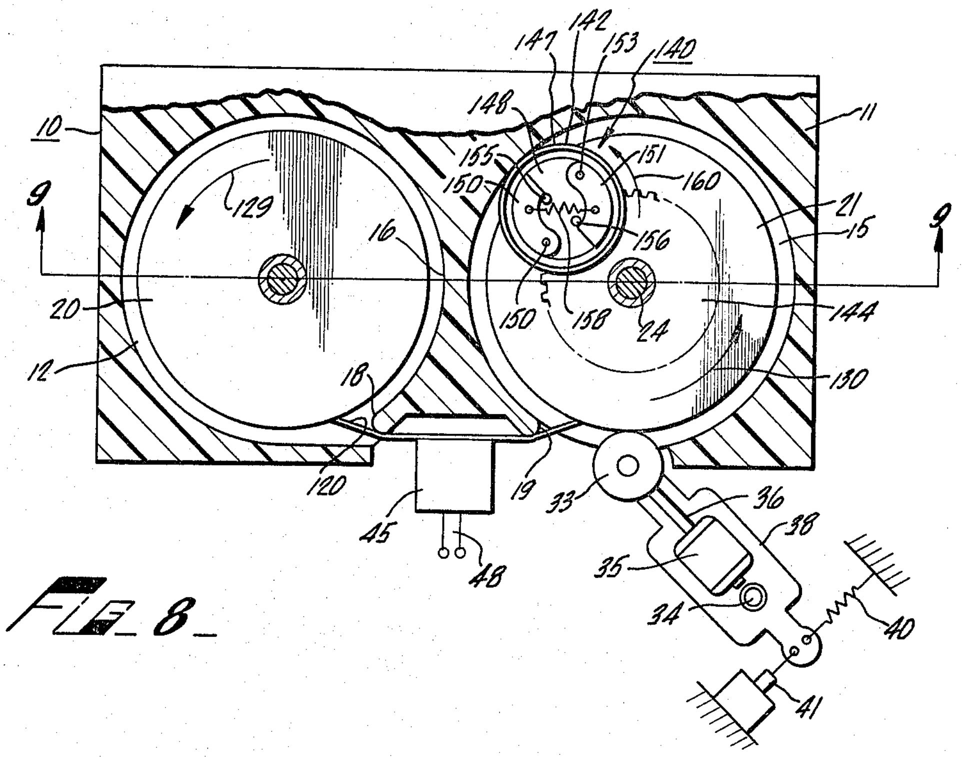
FIG. 8 is a plan view partially broken away of a further preferred embodiment of the invention, including a schematic showing of a transducer and a drive for utilizing and operating the same.
Figure 9:
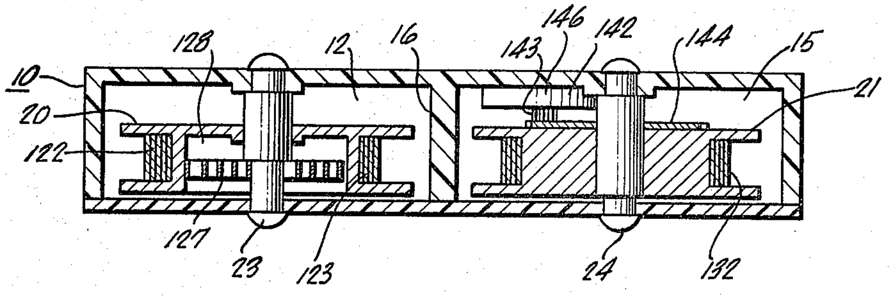
FIG. 9 is a horizontal section view taken along line 9—9 of FIG. 8.

The recording or playback apparatus shown in FIGS. 8 and 9 is similar to a large extent to the apparatus shown in FIGS. 1 and 2 and my initially mentioned earlier application Ser. No. 114,944. Those parts which are similar to corresponding parts of the apparatus shown in FIGS. 1 and 2 of this present application bear the same reference numerals as those corresponding parts.

The apparatus illustrated in FIGS. 8 and 9 again has a support 11 which defines a storage area 12 for a recording medium 120 which, in the instant embodiment, is a conventional magnetic sound recording tape, but could also be a magnetic recording wire, to name a further example. The support 11 again defines a receiving region 15 for the storage medium 120. A reel 20 is rotatably mounted in region 12 by means of a shaft 23. A reel 21 is rotatably mounted in region 15 by means of a shaft 24. The conventional recording tape 120 is wound on the reel 20 in the form of a coil 122, as seen in FIG. 9. The inner end 123 of the tape coil 122 is permanently attached to the hub of the reel 20, such as by means of a strong adhesive. The outer end of the tape 120 is permanently attached to the hub of the reel 21.

A spiral spring 127 is located in a cavity 128 in the reel 20 and is connected between this reel and the stationary part of shaft 23. The spring 127 is arranged to be wound when the reel 20 is rotated in the direction of the arrow 129 shown in FIG. 8.

Preparatory to a recording or a playback operation, a length of tape 120 is pulled from the tape coil 122 on reel 20 and is wound onto the reel 21 in the receiving region 15. To this end, the plunger solenoid 41 is energized so as to move the drive pulley 33 into engagement with a rim of the reel 21. The motor 35 is then energized so as to cause the pulley 33 to rotate the reel 21 in the direction of arrow 130. A coil 132 of tape 120 is thus formed on the reel 21. The tape pulled from the reel 20 during this operation causes the reel to rotate in the direction of arrow 129, so that the spring 127 is wound.

After a desired length of tape has been wound onto the reel 21, the motor 35 and the plunger solenoid 41 are de-energized so that the pulley 33 is moved out of engagement with the reel 21. The spring 127 shown in FIG. 9 will then cause the reel 20 to rotate in a direction opposite to the direction of arrow 129 shown in FIG. 8. Tape that has been wound onto reel 21 will thus be rewound onto the reel 20. During such rewinding, a recording operation may be effected by applying to the terminals 48 of the transducer 45 a recording signal. During a succeeding rewinding operation, information recorded on tape 120 may be read by operating the transducer 45 as a playback head and by applying the playback signal appearing at terminals 48 to conventional amplifying and information or sound reproducing apparatus (not shown).

To enable such recording and playback operation, it is of course necessary that the tape 120 be rewound from the reel 21 onto the reel 20 in an orderly fashion and at a controlled speed. This tape speed need not necessarily be constant throughout the recording or playback operation, but may vary within reasonable limits as long as each bit of information is played back at a tape speed that corresponds to the tape speed at which that bit was recorded. In other words, the tape speed may increase or decrease as a function of the playback time, as long as such increase or decrease corresponds to a like increase or decrease that prevailed during the recording of the information under consideration.

In the embodiment shown in FIGS. 8 and 9, the desired speed control is effected by means of a governor 140 which comprises a centrifugal regulator 142 which has a drive pinion 143, and a gear wheel 144 which is connected to the reel 21.

The simplified form of regulator 142 shown in FIGS. 8 and 9 comprises a housing 146 (see FIG. 9) which defines a brake drum 147 (see FIG. 8). A disc 148 is rotatably mounted in the housing 146 and is driven by the pinion 143. A pair of brake shoes 150 and 151 is pivotally mounted on the disc 148 by pins 152 and 153. A pair of further pins 155 and 156 is mounted on the disc 148 to limit the inward motion of the brake shoes 150 and 151. The two shoes are biased against these pins 155 and 156 by means of a spring 158.

As tape 120 is pulled from the reel 21 and rewound onto the reel 20, the pinion 143 and disc 148 are driven by the gear wheel 144 in the direction of the arrow 160 shown in FIG. 8. The brake shoes 150 and 151 are centrifugally driven against the inner surface of the brake drum 147 where they act to slow down the rotation of the reel 21. The shoes 150 and 151 return to their illustrated position under the force of the spring 158 after the tape has been rewound onto reel 20 and the rotation of reel 21 has stopped.

The governor shown in FIG. 8 may also be used in the embodiment shown in FIG. 4.

It will now be realized that the function of the governor 140 is to control the speed of tape 120 during rewinding operations when information recording and playback take place. Depending on the desired tape speed during recording and playback, the governor 140 may be provided with one or more additional step-up gear wheel stages. This will result in a faster spinning of the disc 148 whereby the brake shoes 150 and 151 are centrifugally actuated at lower speeds of the reel 21, so that the tape speed is maintained at values which are lower than the speed values obtained with only the one gear stage shown in FIGS. 8 and 9.

Another point to be considered in connection with the governor 140 is the possibility of an undesirable regulatory action during the winding of the tape from the reel 20 onto the reel 21. In the embodiment shown in FIGS. 8 and 9, no recording or playback takes place during such forward winding, so that no speed control action is necessary at such time. No special problems are encountered as long as the pulley 33 drives the reel 21 at a speed which is lower, or at least not significantly higher, than the controlled speed of the reel 21 during rewinding of the tape 120 onto the reel 20. However, if it is desired to advance the tape 120 from the reel 20 to the reel 21 at a considerably higher speed, the disc 148 of the regulator 142 will spin at such a velocity that the brake shoes 150 and 151 may be driven into engagement with the drum 147 and may thus exercise an undesirable regulatory action at a time when no control of the tape speed is required. The problem brought about by these circumstances has been solved many years ago in connection with the number dial devices employed in standard telephone subscriber apparatus with self-dialing equipment. In these devices, the dial is driven by the subscriber in one direction and is only controlled as to speed while it moves back to its initial position thereby causing the generation of dialing pulses. If the problem just mentioned is encountered in the apparatus shown in FIGS. 8 and 9, a clutch-action element of the type used in the telephone equipment referred to can be employed so as to prevent rotation of the disc 148 while the tape 120 is advanced from the reel 20 to the reel 21.

Other structural details of the well-known types of telephone dial governor devices may also be employed in the apparatus illustrated in FIGS. 8 and 9, as has already been mentioned in connection with FIG. 4.

It will now be recognized that the apparatus according to FIGS. 8 and 9 permits recording and playback operations without the need for a constant-speed drive motor.

In all the embodiments shown herein, conventional information erasing means may be employed for erasing recorded information preparatory to the recording of other information. This technique and the means employed therefor are conventional and thus not specifically shown herein.

Various further modifications within the scope of the invention will be readily apparent to those skilled in the art.

I claim:

1. Recording and playback apparatus comprising a support defining a recording medium storage region and a recording medium receiving region, a recording medium comprising an elongated resilient member forming in said storage region a coil spring having a preshaped initial configuration and having the property of rewinding itself into said initial configuration when a portion of said elongated resilient member has been pulled from the coil spring and is released to permit the coil spring to rewind itself, means for enabling a recording operation and selectively a playback operation by pulling from said coil spring, and moving to said receiving region, a portion of said elongated resilient member, and means for releasing after a recording operation and after a playback operation the portion of said elongated resilient member pulled from said coil spring to permit said coil spring to rewind itself into said initial configuration.

2. Recording and playback apparatus comprising a recording medium including an elognated resilient member forming a coil spring having a preshaped initial configuration and having the property of rewinding itself into said initial configuration when a portion of said elongated resilient member has been pulled from the coil spring and is released to permit the coil spring to rewind itself, means enabling a recording operation and selectively a playback operation by pulling a portion of said elongated member from said coil, and means for releasing after a recording operation and after a playback operation the portion of said elongated member pulled from said coil spring to permit said coil spring to rewind itself into said initial configuration.

3. Recording and playback apparatus comprising a recording medium including an elongated resilient member forming a coil spring having a preshaped initial configuration and having the property of rewinding itself into said initial configuration when a portion of said elongated resilient member has been pulled from the coil spring and is released to permit the coil spring to rewind itself, means for pulling a portion of said elongated member from said coil spring, and means enabling a recording operation and selectively a playback operation by controlling the rate of speed by which said coil spring rewinds onto itself the portion of the elongated member pulled from the coil.

4. Recording and playback apparatus comprising a support defining a recording medium storage region and a recording medium receiving region, a recording medium comprising an elongated resilient member forming in said storage region a coil spring having a preshaped initial configuration and having the property of rewinding itself into said inital configuration when said elongated resilient member has been pulled from the coil spring and is released to permit the coil spring to rewind itself, a reel rotatably mounted in said receiving region, means connecting an end of said elongated resilient member to said reel so that a portion of said elongated resilient member is pulled from said coil spring when said reel is rotated, and means for rotating said reel to enable a recording operation and selectively a playback operation, said coil spring automatically rewinding itself into said initial configuration after a recording and after a playback operation.

5. Recording and playback apparatus comprising a support defining a recording medium storage region and a recording medium receiving region, a recording medium comprising an elongated resilient member forming in said storage region a coil spring having a preshaped initial configuration and having the property of rewinding itself into said initial configuration when said elongated resilient member has been pulled from the coil spring and is released to permit the coil spring to rewind itself, a reel rotatably mounted in said receiving region, means connecting an end of said elongated resilient member to said reel so that a portion of said elongated resilient member is pulled from said coil spring when said reel is rotated, drive means for rotating said reel, means for placing said drive means into engagement with said reel to provide for a recording operation and selectively for a playback operation, and means for disengaging said drive means from said reel to permit said coil spring to rewind itself into said initial configuration.

6. Recording and playback apparatus comprising a support defining a recording medium storage region and a recording medium receiving region, a recording medium comprising an elongated resilient member forming in said storage region a coil spring having a preshaped initial configuration and having the property of rewinding itself into said initial configuration when said elongated resilient member has been pulled from the coil spring and is released to permit the coil spring to rewind itself, a reel rotatably mounted in said receiving region, means connecting an end of said elongated resilient member to said reel so that a portion of said elongated resilient member is pulled from said coil spring when said reel is rotated, drive means for rotating said reel to pull a portion of said elongated resilient member from said coil spring and rewind said portion onto said reel, means for selectively releasing said drive means from said reel, and means for controlling the rate of speed at which said portion of said elongated resilient member is rewound from said reel onto said coil spring in said storage region.

7. Recording and playback apparatus as claimed in claim 6, wherein said means for controlling said rate of speed includes a governor coupled to said reel.

8. Recording and playback apparatus comprising a recording medium including an elongated resilient member forming a coil spring having a preshaped initial configuration and having the property of rewinding itself into said initial configuration when a portion of said elongated resilient member has been pulled from the coil spring and is released to permit the coil spring to rewind itself, transducing means for recording information on said elongated resilient member and for selectively playing information back from said elongated resilient member, and means for pulling a portion of said elongated resilient member from said coil spring and selectively permitting such portion to rewind itself onto said coil spring and for moving said portion past said transducing means.

9. A recording medium comprising an elongated resilient member forming a coil spring having a preshaped initial configuration and having the property of rewinding itself into said configuration when a portion of the elongated resilient member has been pulled from the coil spring, and a layer of a magnetic recording material on said elongated resilient member.

10. Apparatus for receiving information from and yielding information to a recording and playback transducer, comprising a recording medium including an elongated resilient member forming a coil spring having a preshaped initial configuration and having the property of rewinding itself into said initial configuration when a portion of said elongated resilient member has been pulled from the coil spring and is released to permit the coil spring to rewind itself, a support defining a storage region for said coil spring and a receiving region for the portion of the elongated resilient member pulled from the coil spring, and means for guiding said portion of the elongated resilient member between said storage and receiving regions and past said transducer.

11. Apparatus for receiving information from and yielding information to a recording and playback transducer, comprising a recording medium including an elongated resilient member forming a coil spring having a preshaped initial configuration and having the property of rewinding itself into said initial configuration when a portion of said elongated resilient member has been pulled from the coil spring and is released to permit the coil spring to rewind itself, a support defining a storage region for said coil spring, a receiving region for the portion of the elongated resilient member pulled from the coil spring and a guide having two spaced shoulders for guiding said portion of the elongated resilient member between said storage and receiving regions and past said transducer.

12. Apparatus for receiving information from and yielding information to a recording and playback transducer, comprising a recording medium including an elongated resilient member forming a coil spring having a preshaped initial configuration and having the property of rewinding itself into said initial configuration when a portion of said elongated resilient member has been pulled from the coil spring and is released to permit the coil spring to rewind itself, a support defining a storage region for said coil spring and a receiving region for the portion of the elongated resilient member pulled from the coil spring, means for guiding said portion of the elongated resilient member between said storage and receiving regions and past said transducer, and means for controlling the rate of speed at which said coil spring rewinds itself into said initial configuration.

References Cited by the Examiner

UNITED STATES PATENTS

| | | | |
|---|---|---|---|
| 423,039 | 3/1890 | Edison | 274—11 |
| 600,315 | 3/1898 | Jones | 274—1.5 |
| 3,140,360 | 7/1964 | Whitworth | 179—100.1 |
| 3,165,320 | 1/1965 | Ryan | 274—1.1 |
| 3,177,768 | 4/1965 | Hallamore | 88—28 |

NORTON ANSHER, *Primary Examiner.*

C. B. PRICE, *Assistant Examiner.*